(12) United States Patent
Volk et al.

(10) Patent No.: US 7,013,476 B2
(45) Date of Patent: Mar. 14, 2006

(54) CARTRIDGE FOR MINIATURE OPTICAL DATA STORAGE DISC

(75) Inventors: Steven B. Volk, Boulder, CO (US); Thomas E. Berg, Fort. Collins, CO (US)

(73) Assignee: Vmedia Research, Inc., Boulder, CO (US)

( * ) Notice: Subject to any disclaimer, the term of this patent is extended or adjusted under 35 U.S.C. 154(b) by 70 days.

(21) Appl. No.: 10/423,097

(22) Filed: Apr. 25, 2003

(65) Prior Publication Data
US 2004/0212926 A1  Oct. 28, 2004

(51) Int. Cl.
G11B 23/03 (2006.01)

(52) U.S. Cl. ........................................... 720/726

(58) Field of Classification Search ............... 720/726, 720/725, 728, 732, 735; 360/133; 369/291.1, 369/290.1, 289.1
See application file for complete search history.

(56) References Cited

U.S. PATENT DOCUMENTS

| | | | | |
|---|---|---|---|---|
| 5,140,489 A | * | 8/1992 | Barnard ..................... | 360/133 |
| 5,475,674 A | * | 12/1995 | Yamashita et al. .......... | 720/735 |
| 6,665,261 B1 | * | 12/2003 | Okamoto et al. ........... | 720/738 |
| 6,687,215 B1 | * | 2/2004 | Bagnell et al. ............. | 720/740 |
| 6,779,194 B1 | * | 8/2004 | Okamoto et al. ........... | 720/725 |
| 6,831,888 B1 | * | 12/2004 | Roberts ...................... | 720/728 |

FOREIGN PATENT DOCUMENTS

| | | | |
|---|---|---|---|
| JP | 07320359 | * | 12/1995 |
| JP | 10144031 | * | 5/1998 |

* cited by examiner

Primary Examiner—Angel Castro
(74) Attorney, Agent, or Firm—Silicon Valley Patent Group LLP

(57) ABSTRACT

A cartridge for an optical data storage disc includes a sheet metal sheath that is folded back on itself and a plastic insert that is inserted into the sheath. An opening is formed in the plastic insert for holding an optical data storage disc. The sheath includes two wall portions that are located on opposite sides of a bend area, where the sheet metal is folded. The two wall portions are attached to each other, preferably by spot-welding, to form a structurally stable sandwich that includes the plastic insert between the wall portions. The opening in the plastic insert becomes a cavity for holding the disc. A shutter opening is formed in one of the wall portions, and spindle openings are formed in both wall portions. A shutter covers the shutter opening when the cartridge is not operational to protect the disc. The disc is rotated by the spindle of an external disc drive which enters a central hole of the disc through the spindle openings. The use of sheet metal wall portions in conjunction with the plastic insert allows the cartridge to be made very thin. Used with an appropriate disc drive, the cartridge may be employed to provide a large amount of data to a CompactFlash® or other type of card slot.

37 Claims, 9 Drawing Sheets

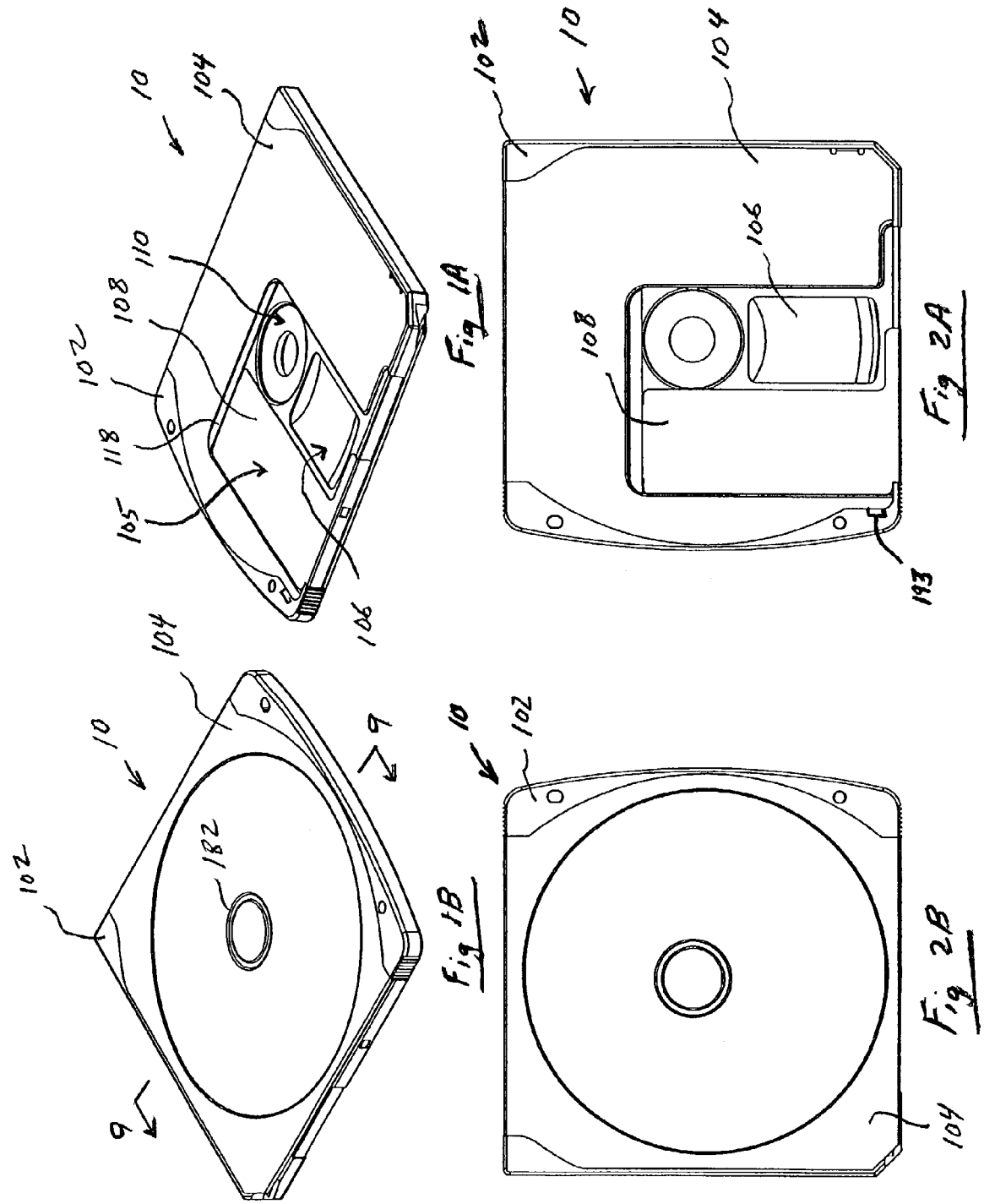

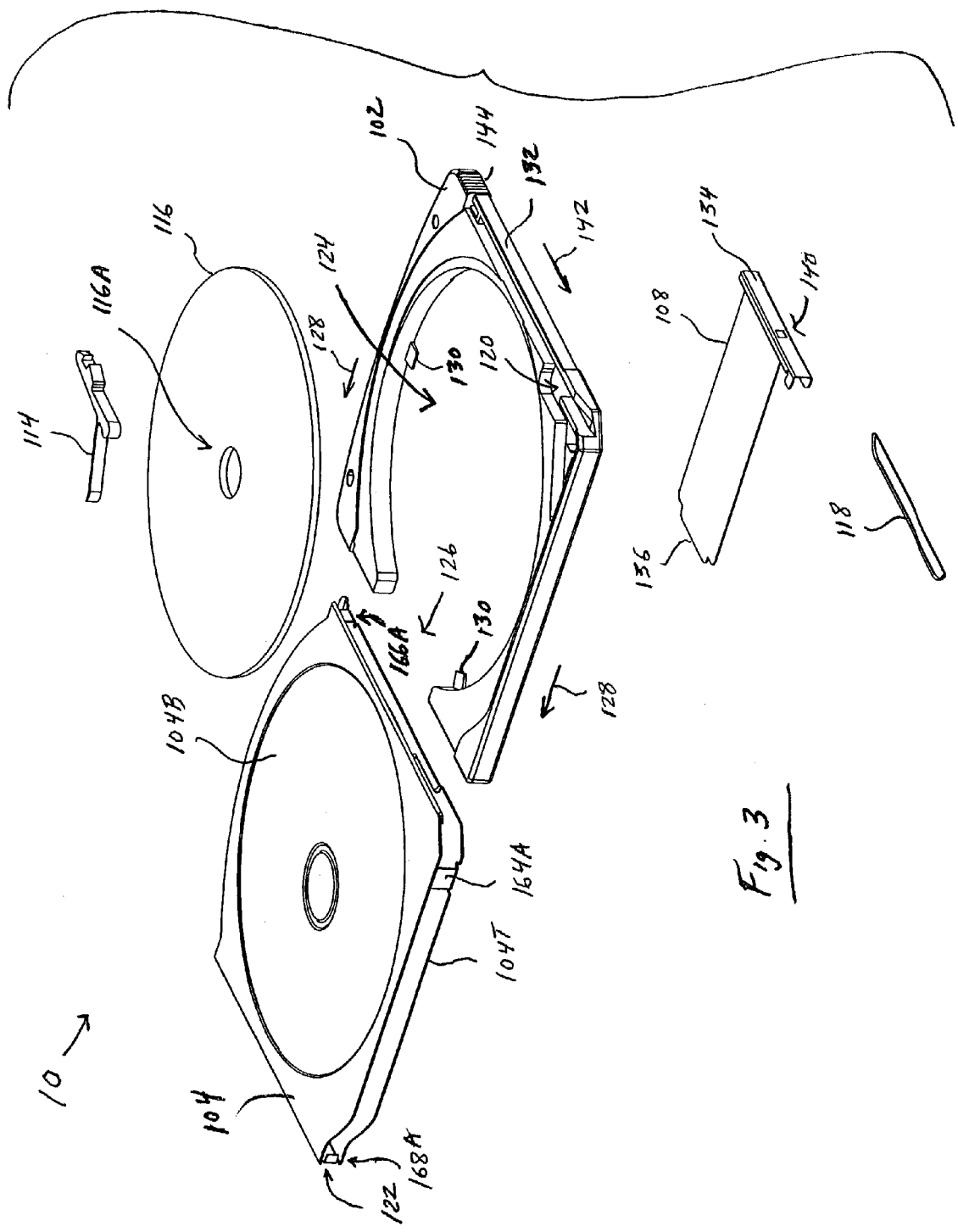

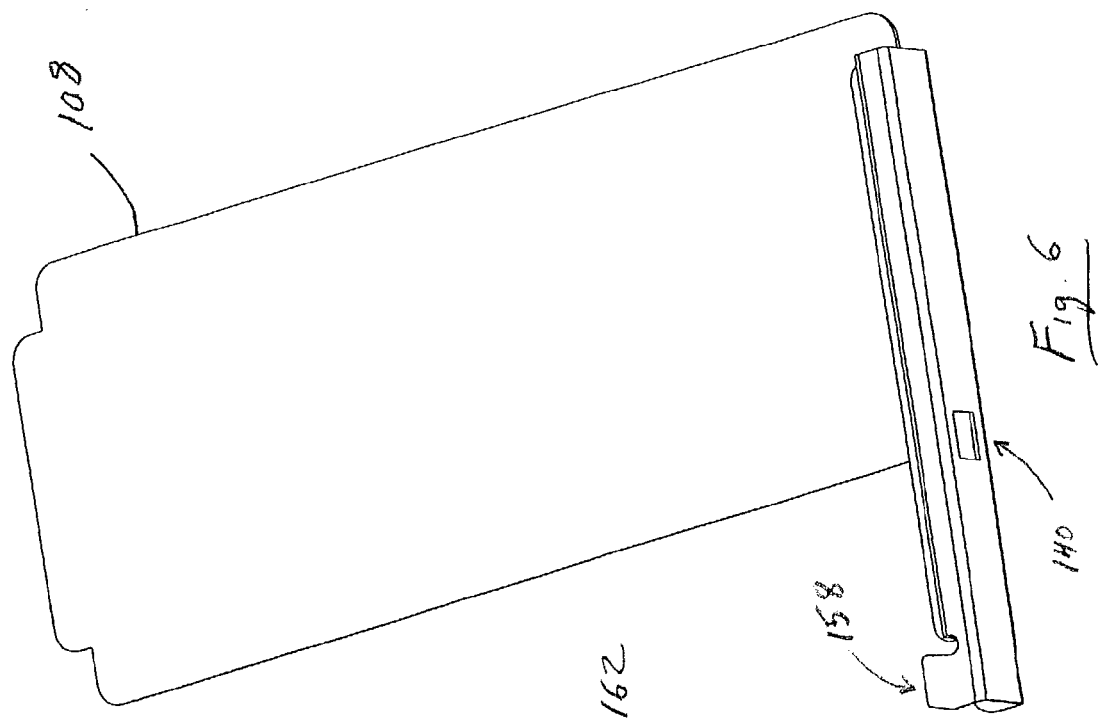
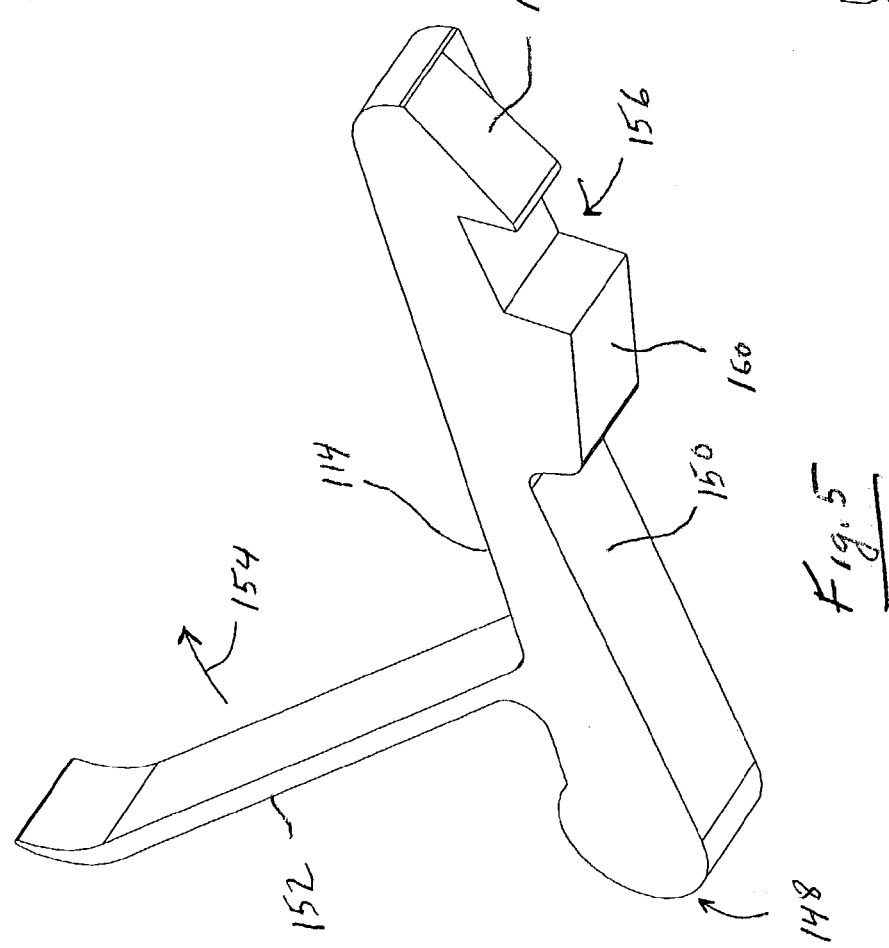

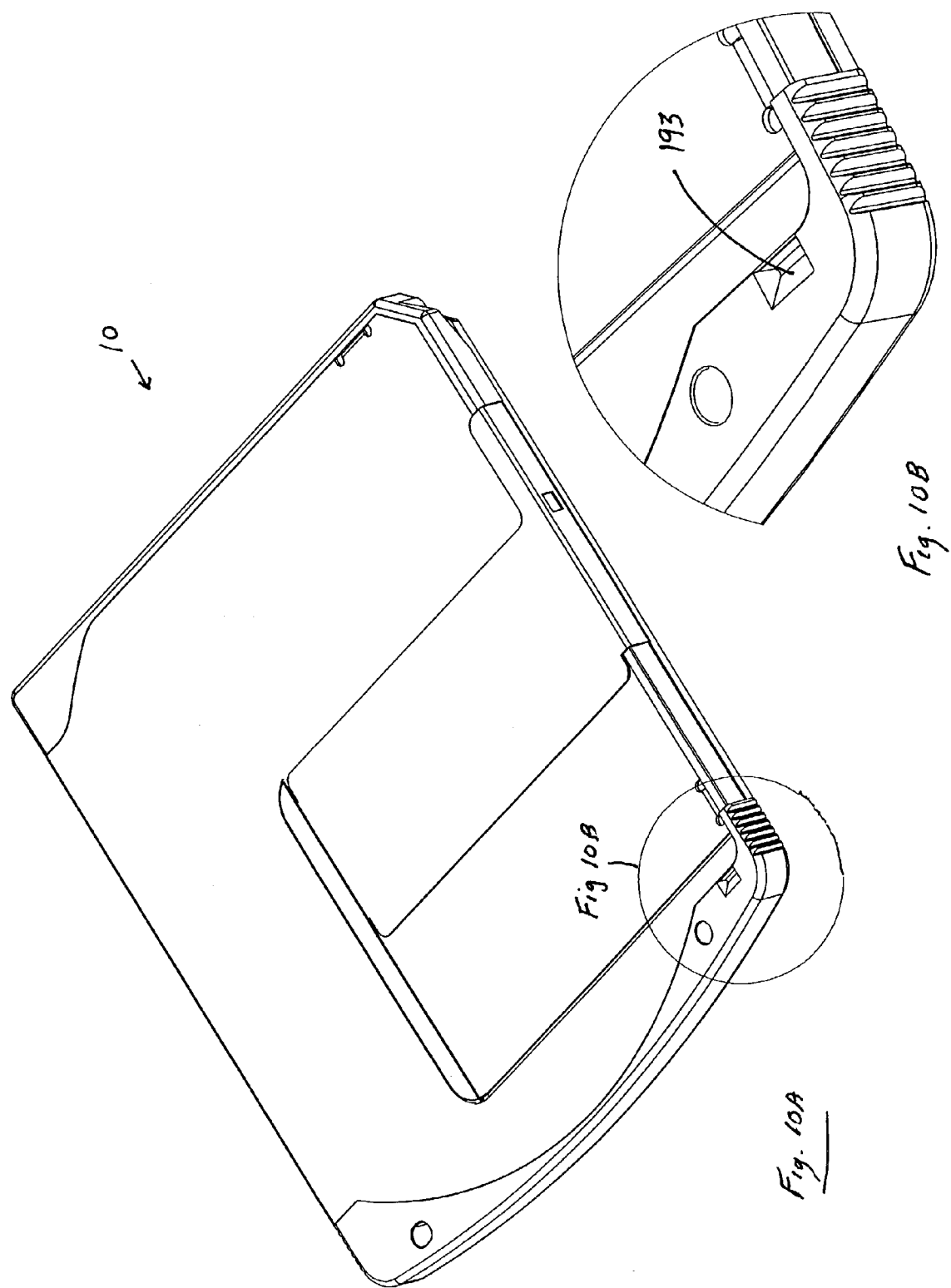

CARTRIDGE FOR MINIATURE OPTICAL DATA STORAGE DISC

CROSS-REFERENCE TO RELATED APPLICATION

This application is related to application Ser. No. 10/423,701, which is co-owned and filed concurrently herewith, and which is incorporated herein by reference in its entirety.

FIELD OF THE INVENTION

This invention relates to high-volume data storage and, in particular, to a cartridge for an optical data storage disc that is compatible with an industry-standard memory card slot in a portable computing device.

BACKGROUND OF THE INVENTION

Consumer entertainment technologies are moving towards high resolution color displays for mobile entertainment. Increasingly, consumers want to take their entertainment with them. Cross-country travelers and cross-town commuters are eagerly pursuing gaming, music and video entertainment activities on cell phones, personal digital assistants (PDAs) and portable computers. At present, however, the entertainment experience is limited, even primitive, compared to what consumers have come to expect from their game consoles, home theaters and DVD-equipped computers.

The main problem is data storage. The fact is that sophisticated digital entertainment is data-intensive, and it is growing more so every day. Traditional small "form factor," portable media such as CompactFlash® cards, SD flash cards, Memory Stick™ and other solid state memory devices simply cannot deliver the capacity and price per megabyte required for a high-quality entertainment experience. Recording content onto solid state memory cards in high volume is expensive and impractical, and securing that content effectively is very difficult.

While some experts predict that broadband Internet access will deliver high-quality games and movies to mobile consumer electronics devices, there are significant barriers to success. Cell phone networks are designed to transmit voice communications and are simply not efficient for high-capacity data transmission. Cell connections are not capable of the required speeds and are notoriously unreliable, with frequent dead zones and dropped connections. While games are being delivered to cell phones currently, the quality of game play and the game environment cannot begin to approach that of a console.

WiFi, or 802.11, wireless is designed for data transmission, and the growing of WiFi hotspots looks attractive on the surface for delivering large amounts of data to mobile devices. Internet access and email application for multiple users are easily accommodated by WiFi. Nonetheless, managing streaming and interactive content such as multiplayer games and high-quality video or movies for thousands, if not millions, of users simultaneously will be challenging for any network. Security is also a problem for WiFi, leaving content providers open to potential pirating activities.

Moreover, the data storage problem would still exist. For any sort of networked delivery system to be viable, mobile consumer devices will have to embed significant amounts of storage to hold large, downloaded game and movie files, and to track a player's progress within the game. Perhaps the most significant problem for networked content delivery is cost. It has been estimated that it can cost more than $30 to send a DVD-quality film over the Internet.

Disc-based distribution costs are far lower. Even more compelling is the fact that consumers have consistently demonstrated their preference for purchasing high-value content on discs, as evidenced by the recent upswing in DVD sales.

Clearly, the mobile entertainment industry needs an economical, small form factor, secure storage technology to meet the growing demand for a portable, high-quality entertainment experience. In addition, it is anticipated that a storage device capable of holding large amounts of data would find application in other areas, such as in portable computers used in connection with the homeland security effort.

SUMMARY OF THE INVENTION

A cartridge in accordance with this invention includes a sheet metal sheath and an insert, preferably made of plastic. The sheath is made from a sheet of sheet metal that is preferably folded back on itself to form wall portions on opposite sides of a bend area. An insert, preferably made of plastic, is inserted into the sheath, and the wall portions are attached to each other, for example by spot welding, to form a small, structurally sound unit. The insert has an opening into which a data storage disc is placed. The disc is preferably hubless and accessible by a spindle through an opening in the sheath. One of the wall portions has a window which allows access to the data area of the disc and a shutter which covers the window and protects the disc when the cartridge is not inside a disc drive.

Using a metal sheath allows the cartridge to be made very thin (e.g., 2.0 mm or less thick) without compromising its structural integrity. With this structure, the cartridge can provide large amounts of data (e.g., 2 Gbytes or more) to a small, industry-standard slot that is generally designed for use with a data card. One example is the CompactFlash® slot that is used in many PDAs and other small computers. Spot-welding the wall portions to each other can be performed very quickly without adhesives or the associated cure time.

Ideally, the cartridge of this invention is used with a disc drive of the type described in the above-referenced application Ser. No. 10/423,701.

BRIEF DESCRIPTION OF THE DRAWINGS

FIGS. 1A and 1B are perspective views of the top and bottom, respectively, of the cartridge of this invention.

FIGS. 2A and 2B are plan views of the top and bottom, respectively, of the cartridge of this invention.

FIG. 3 is an exploded view of the cartridge.

FIG. 5 is a detailed view of the latch.

FIG. 6 is a detailed view of the shutter.

FIGS. 10A and 10B show the location of the retention recess on the cartridge.

DESCRIPTION OF THE INVENTION

Figure 4A:
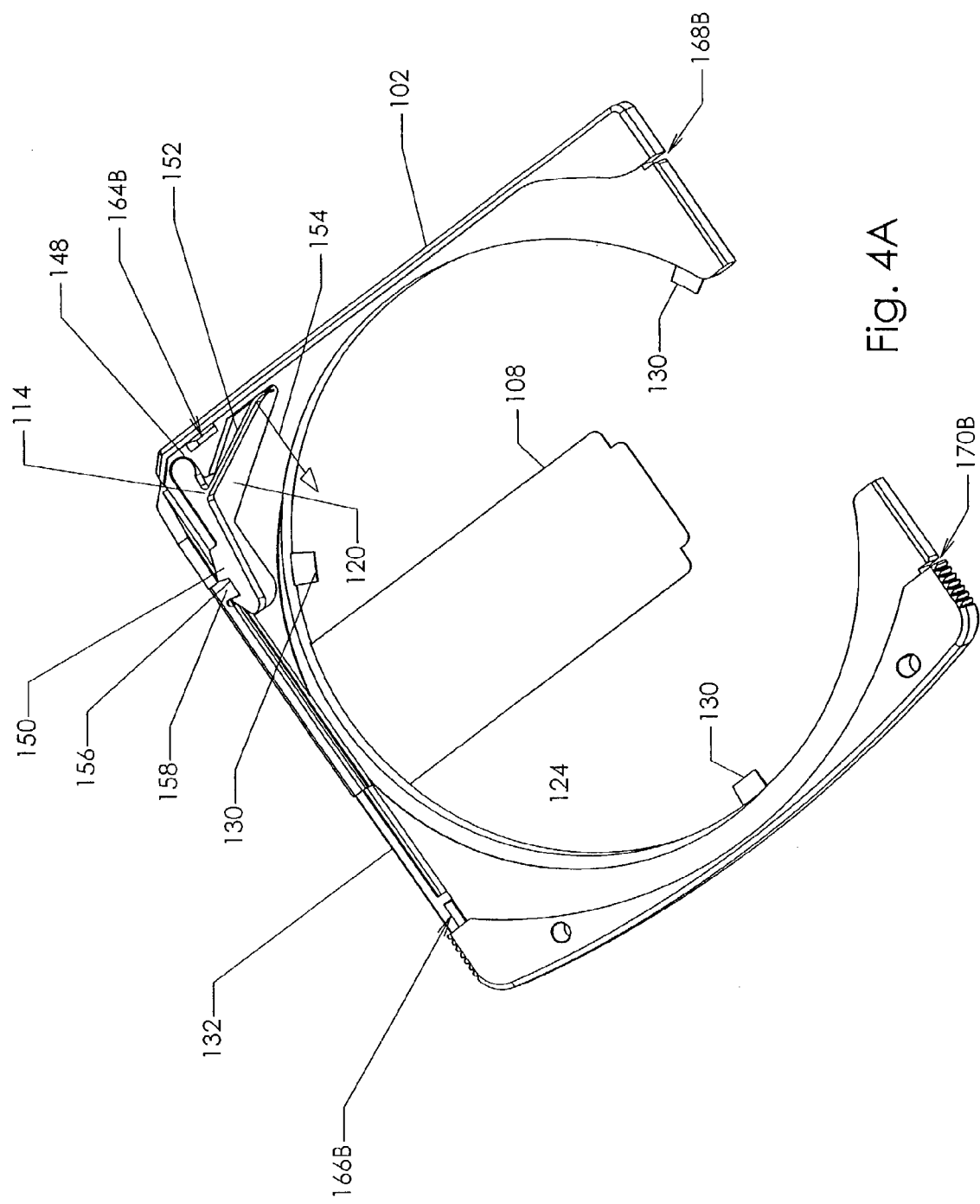
FIGS. 4A and 4B are views of the plastic insert and shutter showing the shutter in the closed and open positions, respectively.

FIGS. 1A and 1B show perspective views of a cartridge 10 according to this invention. Included in both views are an insert 102, which is preferably made of plastic, and a sheath 104, which is made of sheet metal, preferably stainless steel. Insert 102 will be referred to as a "plastic insert" herein, although it will be understood that insert 102 could be made of other materials, such as metals, ceramics, linen phenolic, wood, composite materials, compressed paper or other fibers. FIG. 1A shows the top side of cartridge 10, and FIG. 1B shows the bottom side of cartridge 10. FIGS. 2A and 2B are top and bottom plan views of cartridge 10, respectively. Also visible in these views are a shutter opening 106, a shutter 108, and a spindle opening 110. As shown in FIG. 2A, a recess 193 is formed in cartridge 10. Recess 193 interacts with a mechanism on the drive to retain cartridge 10 in the drive after it has been inserted into the drive. Recess 193 is also shown in FIGS. 10A and 10B.

FIG. 3 shows an exploded view of cartridge 10, viewed from the bottom side. As shown, sheet metal sheath 104 is preferably made from a single piece of sheet metal that is folded back on itself in a bend area 122, forming a bottom wall portion 104B and a top wall portion 104T on the opposite sides of bend area 122. Plastic insert 102 is inserted into sheath 104 in the direction indicated by the arrows 128. Plastic insert 102 includes an opening 124 wherein an optical data storage disc 116 is enclosed, and one edge of plastic insert 102 has a gap 126 that leads to opening 124. When cartridge 10 is fully assembled, gap 126 of plastic insert 102 is adjacent the bend area 122 of sheath 104. Three tabs 130 (of which only two are visible) project radially inward from the edge of opening 124, which is in the shape of a circular arc. Disc 116 rests on tabs 130 during the assembly of cartridge 10, before plastic insert 102 has been inserted into sheath 104. In another embodiment, the metal sheath includes wall portions that are separate from each other.

Shutter 108 fits adjacent to top wall portion 104T and moves between an open position, wherein shutter opening 106 is exposed, and a closed position, wherein shutter opening 106 is closed. Shutter 108 slides in a recessed area 105 of wall portion 104T, shown in FIG. 1A, that is formed by stamping the sheet metal. The inside surface of shutter 108 may be coated with PTFE or another coating to reduce friction and wear. In moving between the open and closed positions, shutter 108 slides on a rail 132 that is formed in plastic insert 102. A sliding portion 134 of shutter 108 slides on rail 132. A tab 136 at a cantilevered end of shutter 108 slides under a metal strip 118, preferably stainless steel, which is welded to the face of top wall portion 104T.

Shutter 108 is locked in the closed position by a latch 114, which fits into a latch recess 120 formed in plastic insert 102. A rectangular window 140 in shutter 108 is designed to engage a feature of an external disc drive to pull shutter 108 from the closed position to the open position when cartridge 10 is inserted into the disc drive. In this embodiment, cartridge 10 is inserted into a disc drive in the direction of arrow 142, and a pair of knurled areas 144 are provided on plastic insert 102 to assist the user in manually gripping cartridge 10. The second knurled area 144, located near the upper corner of plastic insert 102, is not visible in FIG. 3.

Figure 4B:
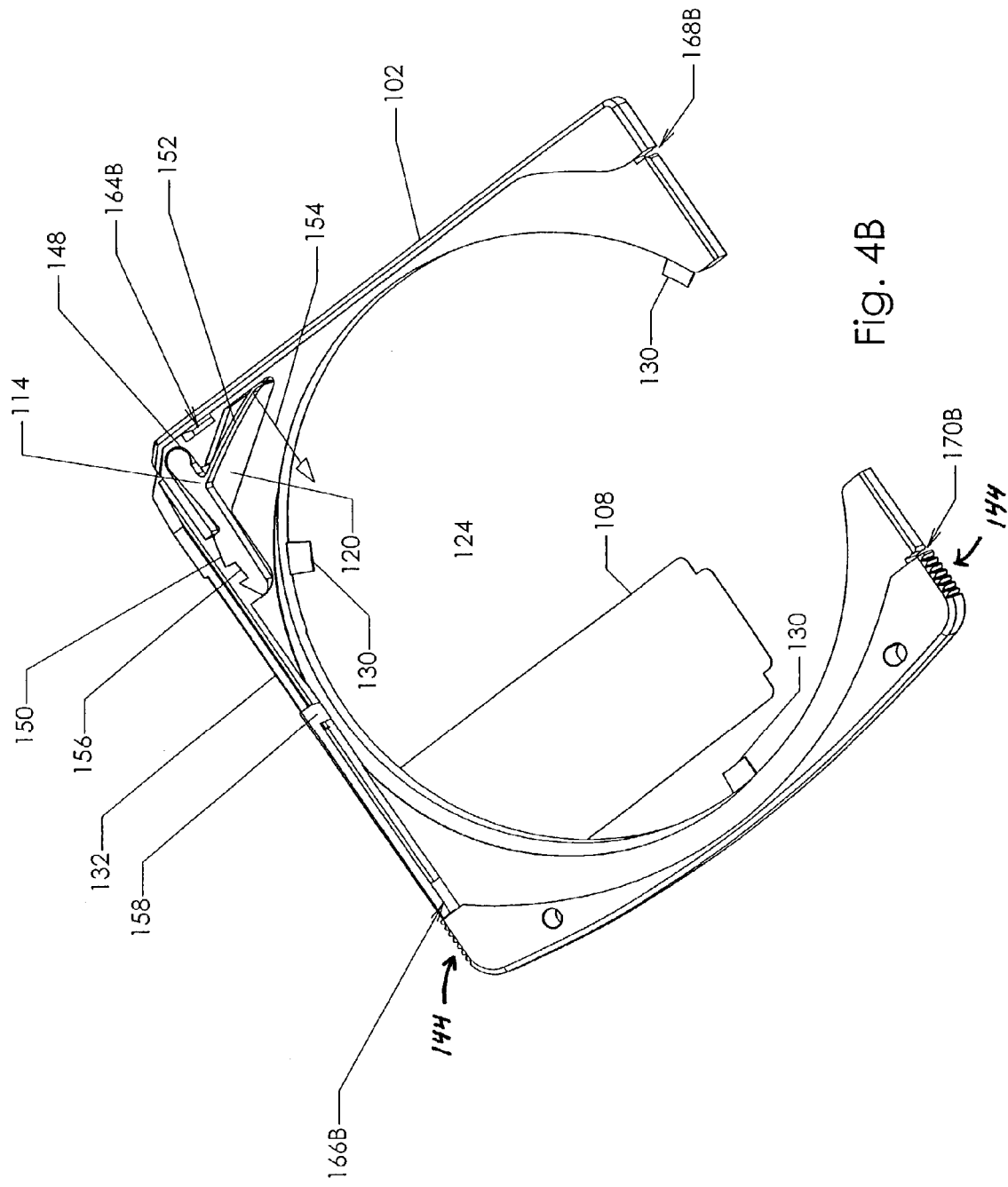

FIGS. 4A and 4B show plastic insert 102 and shutter 108, with shutter 108 in the open and closed positions, respectively. FIGS. 5 and 6 are detailed views of latch 114 and shutter 108, respectively. As shown in FIGS. 4A and 4B, latch 114 rests in latch recess 120. Latch 114 is preferably made of molded plastic, preferably nylon. As shown in FIGS. 4A, 4B and 5, latch 114 has a cylindrical surface 148 which contacts a corresponding cylindrical wall of recess 120, thereby allowing a main body 150 of latch 114 to rotate within recess 120 about a vertical axis defined by cylindrical surface 148. Latch 114 also contains a spring arm 152, which is made thin enough to flex and which is angled with respect to the main body 150 such that spring arm 152 flexes slightly in the direction of arrow 154 when latch 114 is placed in recess 120, thereby maintaining latch 114 in the extended position shown in FIGS. 4A and 4B. With this structure, there is no need to connect latch 114 to plastic insert 102 and/or sheath 104 by means of a rotary shaft or pin. This is a significant feature when the parts must be very small.

Latch 114 also contains a notch 156 which mates with a tab 158 of shutter 108 when shutter 108 is in the closed position. When shutter 108 is closed, the spring force provided by spring arm 152 rotates main body 150 of latch 114 such that tab 158 remains in engagement with notch 156. When shutter 108 is to be opened, typically by inserting cartridge 10 into a disc drive, an external feature of the disc drive (not shown) slides against a ramp 160, thereby opposing the force of spring arm 152 and forcing main body 150 to rotate in such a way the notch 156 retracts into plastic insert 102 and is disengaged from tab 158. When notch 156 and tab 158 have been separated, an external feature (not shown) engages window 140, moving shutter 108 from the closed position to the open position. When cartridge 10 is removed from the disc drive, the external feature slides shutter 108 from the open position to the closed position, and tab 158 slides on a ramp 162 (see FIG. 5), again retracting latch 114 until tab 158 clears the ramp 162 and again rests in notch 156.

Figure 8:
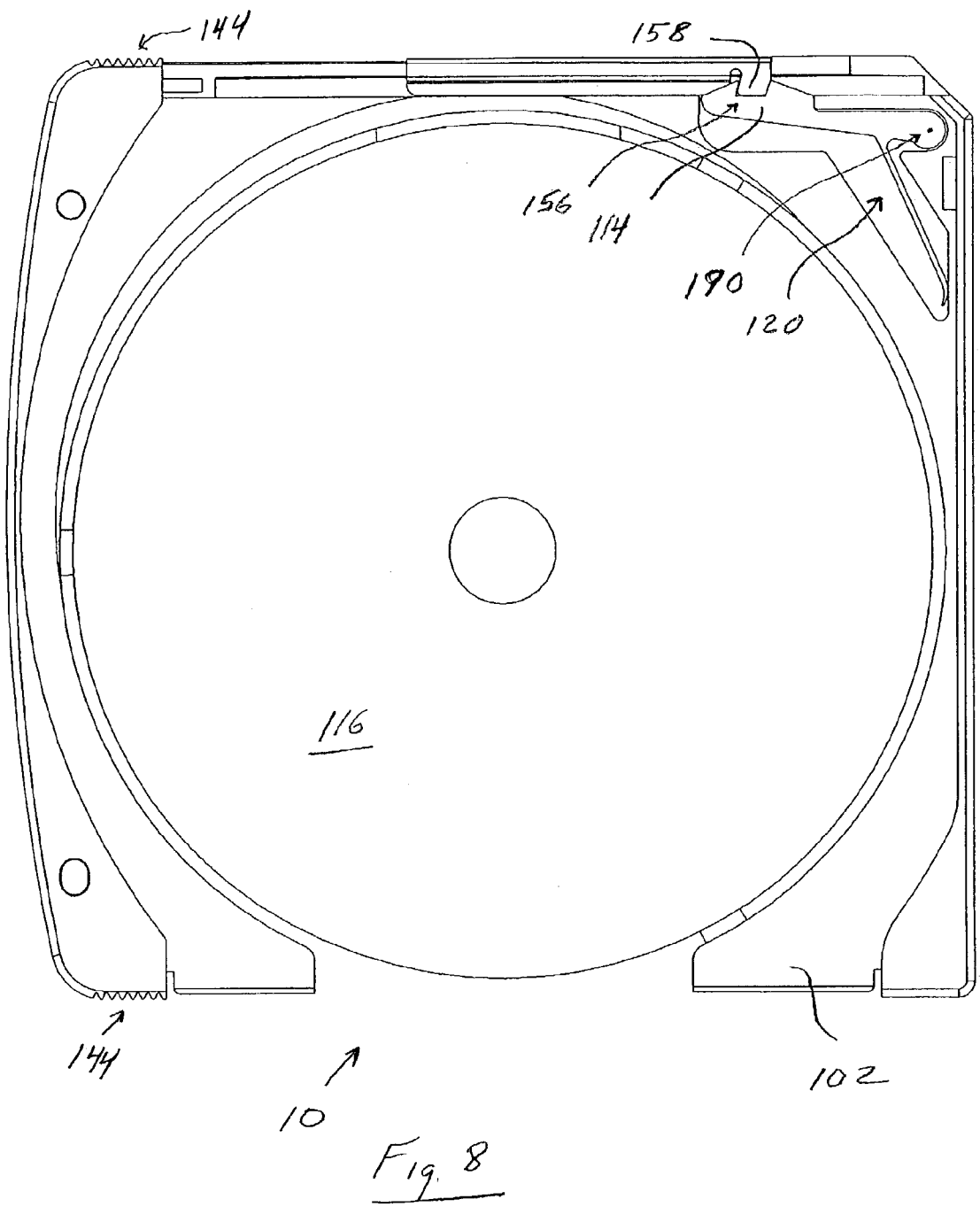
FIG. 8 top view of the plastic insert showing the disc and the latch.

FIG. 8 is a top view of cartridge 10 with the sheet metal sheath 104 removed, showing the position of latch 114 in recess 120 as well as the location of the axis of rotation 190 of latch 114. Also shown in FIG. 8 is the engagement of notch 156 and tab 158.

It will be understood that there are numerous other ways of providing a shutter locking function. This invention is not limited to the example described above, but rather may employ a wide variety of alternative techniques for controlling the shutter.

Referring again to FIG. 3, sheet metal sheath 104 contains metal tabs 164A and 166A, which project from top wall portion 104T. When sheath 104 is in a relaxed condition, the ends of tabs 164A and 166A abut bottom wall portion 104B. Referring to FIG. 4A, slots 164B and 166B are formed in plastic insert 102, with the dimensions of tab 164A being approximately the same as the dimensions of slot 164B, and the dimensions of tab 166A being approximately the same as the dimensions of slot 166B. In short, tabs 164A and 166A fit snuggly into slots 164B and 166B, respectively.

Prior to the assembly of plastic insert 102 and sheet metal sheath 104, disc 116 is placed in opening 124, resting on tabs 130. The wall portions 104T and 104B are then separated slightly, and plastic insert 102 is inserted into sheath 104, until tab 164A is in slot 164B and tab 166A is in slot 166B. Since sheath 104 is preferably made of a resilient material such as stainless steel, wall portions 104T and 104B can flex sufficiently to allow this to take place and then return to their original shape. At this point, the ends of tabs 164A and 166A are spot-welded to wall portion 104B. This produces a very rigid structure.

To increase the strength of cartridge 10, sheath 104 also contains tabs 168A and 170A, which extend laterally from bend area 122. Tab 168A is shown in FIG. 3, and it will be understood that tab 170A extends in a similar manner at the opposite end of bend area 122. Referring to FIG. 4A, plastic insert has niches 168B and 170B formed on the opposite sides of gap 126. As plastic insert 102 is inserted into sheath 104, as described above, tab 168A fits into niche 168B, and tab 170A fits into niche 170B. This arrangement provides additional structural stability in the vicinity of gap 126.

Figure 7A:
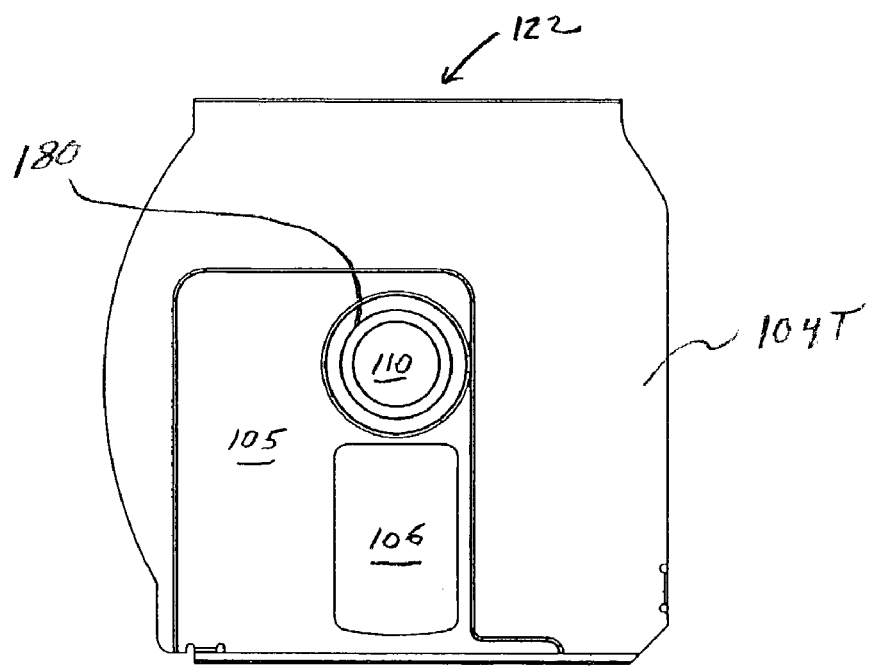
FIGS. 7A and 7B are plan views of top and bottom, respectively, of the metal sheath.
Figure 7B:
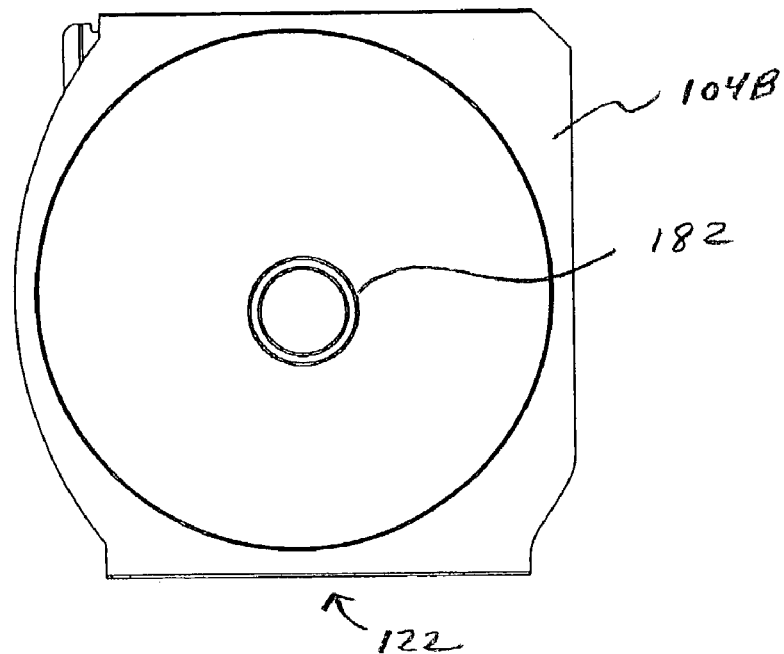
Figure 9:
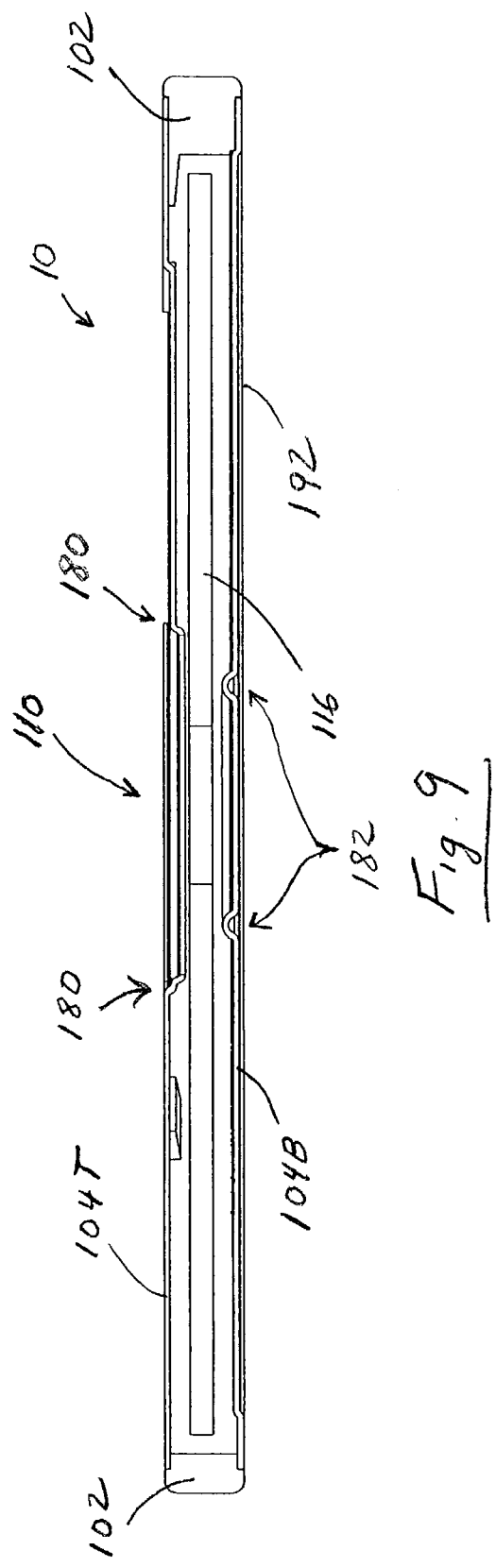
FIG. 9 is a cross-sectional view of the cartridge taken at section 9—9 shown in FIG. 1B.

Disc 116 is designed to operate with a spindle hub having a barbed, snap-fit retainer similar to those employed in ordinary CD drives. Thus, as shown in FIG. 3, disc 116 has a central hole 116A but does not have a hub. When cartridge 10 has been fully assembled, disc 116 is supported by raised rings 180 and 182, shown in FIGS. 7A and 7B, that are formed on the inside surfaces of wall portions 104T and 104B, respectively. Raised rings 180 and 182 are embossed in the sheet metal. In one embodiment raised rings 180 and 182 are 0.35 mm high. FIG. 9 is a cross-sectional view of cartridge 10 showing the locations of raised rings 180 and 182. As indicated, raised ring 180 is located at the circumference of spindle opening 110. Also shown in FIG. 9 is a paper label 192 that fits in a stamped recess in the bottom wall portion of 104B of sheet metal sheath 104. This is sometimes referred to as the "label side" of cartridge 10.

In one embodiment, cartridge 10 is designed to fit into a disc drive that fits into a CompactFlash® slot in a PDA, for example. The thickness of such a cartridge could be targeted at 2.0 mm. Disc 116 could be 32 mm in diameter and 0.7 mm thick, leaving about 1.3 mm for remainder of the cartridge. Top wall portion 104T and shutter 108 are on one side of disc 116, and bottom wall portion 104B is on the other side of disc 116. If sheath 104 and shutter 108 are made of a sheet of stainless steel 0.15 mm thick, the combined thicknesses of these components would account for 0.45 mm. In addition, there might be a clearance of about 0.025 mm between the shutter 108 and top wall portion 104T, and a label 0.100 mm thick might be placed on one side of the cartridge, increasing the total to 0.575 mm. This would leave 0.725 mm (1.3-0.575) for the clearance between disc 116 and the inside surfaces of wall portions 104T and 104B, or 0.3625 mm on each side of disc 116. Assuming a vertical disc runout of ±0.05 mm, a clearance of 0.3125 mm remains for the feature size and position tolerances and any runout caused by the spindle and disc-to-spindle interface.

By comparison, if the top and bottom walls of the cartridge were made of plastic, a stable structure would require a minimum thickness on the order of 0.32 mm, instead of 0.15 mm for the sheet metal (the shutter thickness would remain the same). In addition, 0.07 mm would have to be allowed for variations in the flatness of the plastic walls. Thus the 0.3125 mm clearance on each side of the disc would be reduced to 0.0725 mm (0.3125−((0.32−0.15)+0.07))). This is too small to accommodate the remaining variables such as runout caused by the spindle.

The embodiments of this invention described above are illustrative and not limiting. Many alternative embodiments within the broad scope of this invention will be apparent to those of skill in the art.

What is claimed is:

1. A cartridge for a data storage disc comprising:
   an insert having an opening for enclosing an optical data storage disc; and
   a sheet metal sheath comprising first and second wall portions, said sheet metal sheath being bent back on itself at a bend area, said first and second wall portions being on opposite sides of said bend area, said first wall portion being disposed adjacent to a first side of said insert, said second wall portion being disposed adjacent to a second side of said insert, said first and second wall portions overlying said opening so as to form a cavity for said optical data storage disc, said sheet metal sheath further comprising a plurality of metal tabs, each of said tabs extending from one of said first and second wall portions and being bonded to the other of said first and second wall portions.

2. The cartridge of claim 1 wherein each of said metal tabs is welded to one of said first and second wall portions.

3. The cartridge of claim 2 wherein at least one of said metal tabs extends through a slot in said insert.

4. The cartridge of claim 1 wherein said insert comprises a gap extending through an entire thickness of said insert along a first edge of said insert, said gap leading to said opening.

5. The cartridge of claim 4 wherein said bend area of said sheet metal sheath lies adjacent to said first edge of said insert.

6. The cartridge of claim 5 wherein at least a portion of said bend area forms a wall of said cavity at said gap.

7. The cartridge of claim 6 wherein said first and second wall portions are connected to each other by means of a plurality of metal tabs.

8. The cartridge of claim 7 wherein each of said metal tabs is welded to one of said first and second wall portions.

9. The cartridge of claim 8 wherein each least one of said tabs extends through a slot in said insert.

10. The cartridge of claim 9 wherein said sheet metal sheath comprises first and second metal tabs, both of said first and second metal tabs extending from one of said first and second portions, said metal tabs being welded to the other of said first and second portions.

11. The cartridge of claim 5 wherein said sheet metal sheath comprises at least two additional metal tabs, said additional metal tabs extending from said bend area.

12. The cartridge of claim 11 wherein said additional metal tabs protrude into respective niches formed in said first edge of said insert.

13. The cartridge of claim 12 wherein at least two of said niches are located on opposite sides of said gap.

14. The cartridge of claim 1 wherein at least a part of an edge of said opening is in the shape of a circular arc.

15. The cartridge of claim 14 comprising a plurality of disc-holding tabs extending radially inward from the edge of said opening.

16. The cartridge of claim 15 comprising an optical data storage disc in said cavity.

17. The cartridge of claim 16 wherein said disc is hubless.

18. The cartridge of claim 1 wherein a shutter opening is formed in said first wall portion.

19. The cartridge of claim 18 comprising a shutter, said shutter slideable along said first wall portion so as to open and close said shutter opening.

20. The cartridge of claim 19 wherein said insert comprises a rail, an edge region of said shutter being slideable along said rail.

21. The cartridge of claim 19 wherein said shutter is made of sheet metal.

22. The cartridge of claim 19 wherein said shutter comprises a first latching feature.

23. The cartridge of claim 22 comprising a latch for holding said shutter in a closed position over said shutter opening.

24. The cartridge of claim 23 wherein said latch comprises a second latching feature, said first and second latching features mating when said shutter is in said closed position.

25. The cartridge of claim 24 wherein said first latching feature comprises a tab and said second latching feature comprises a notch.

26. The cartridge of claim 24 wherein said shutter comprises a third feature for engaging an external mechanism to move said shutter from said closed position.

27. The cartridge of claim 23 wherein said latch is retained in a latch recess in said insert.

28. The cartridge of claim 27 wherein said latch comprises a first cylindrical surface and said latch recess comprises a second cylindrical surface, said first and second cylindrical surfaces being in contact with each other.

29. The cartridge of claim 28 wherein said latch is capable of rotating within said latch recess, said first and second cylindrical surfaces sliding against each other as said latch rotates within said latch recess.

30. The cartridge of claim 29 wherein said latch is not connected to said insert by means of a rotatable shaft.

31. The cartridge of claim 30 wherein said latch comprises a flexible spring portion abutting a surface of said latch recess, said spring portion flexing as said latch rotates in said latch recess.

32. The cartridge of claim 31 wherein said latch is formed of plastic.

33. The cartridge of claim 1 wherein said insert is formed of plastic.

34. A cartridge for an optical data storage disc comprising:
    a plastic insert, said insert having a circular opening for holding said optical data storage disc, said opening being open through a gap on one edge of said plastic insert;
    a sheet metal sheath, said sheet metal sheath being bent around said one edge of said plastic insert to form first and second wall portions, said first and second wall portions being adjacent to first and second sides of said plastic insert, respectively, and overlying said opening, a closeable shutter opening being formed in one of said wall portions, spindle openings being formed in both of said wall portions;
    a pair of metal tabs, each of said metal tabs extending from one of said first and second wall portions through a slot in said plastic insert and being welded to the other of said first and second wall portions;
    a pair of additional metal tabs extending from said sheet metal sheath, said additional metal tabs protruding into respective niches in said plastic insert, said niches being formed on opposite sides of said gap; and
    an optical data storage disc positioned in said opening.

35. The cartridge of claim 34 wherein a thickness of said cartridge is no greater than about 2.0 mm.

36. The cartridge of claim 34 wherein said sheet metal sheath is formed of stainless steel.

37. The cartridge of claim 36 wherein said sheet metal sheath is about 0.15 mm thick.

* * * * *